United States Patent
Ramirez de Arellano

(10) Patent No.: US 6,746,717 B2
(45) Date of Patent: Jun. 8, 2004

(54) METHOD OF APPLYING CONCRETE-BASED MATERIAL

(76) Inventor: Eduardo Ramirez de Arellano, P.O. Box 6451, Mayaguez, PR (US) 30691

(*) Notice: Subject to any disclaimer, the term of this patent is extended or adjusted under 35 U.S.C. 154(b) by 0 days.

(21) Appl. No.: 09/730,526

(22) Filed: Dec. 5, 2000

(65) Prior Publication Data

US 2002/0102354 A1 Aug. 1, 2002

(51) Int. Cl.$^7$ .................................................. B05D 1/38
(52) U.S. Cl. .................. 427/270; 427/272; 427/356; 427/403
(58) Field of Search .......................... 427/270, 271, 427/274, 272, 355, 356, 403, 140; 52/311.1, 314, 315, 316, 745.41

(56) References Cited

U.S. PATENT DOCUMENTS

| | | | |
|---|---|---|---|
| 2,035,172 A | * | 3/1936 | Lurie |
| 3,853,577 A | * | 12/1974 | Nishida et al. |
| 4,222,785 A | | 9/1980 | Henderson |
| 4,229,225 A | | 10/1980 | Kraszewski et al. |
| 4,349,588 A | * | 9/1982 | Schiffer |
| 4,741,777 A | | 5/1988 | Williams et al. |
| 4,746,552 A | | 5/1988 | Tokumoto et al. |
| 5,203,629 A | * | 4/1993 | Valle et al. |
| 5,378,279 A | | 1/1995 | Conroy |
| 5,460,648 A | | 10/1995 | Walloch et al. |
| 5,651,816 A | | 7/1997 | Kobayashi et al. |
| 5,690,729 A | | 11/1997 | Jones, Jr. |
| 5,728,209 A | | 3/1998 | Bury et al. |
| 5,965,201 A | | 10/1999 | Jones, Jr. |

* cited by examiner

*Primary Examiner*—Fred J. Parker
(74) *Attorney, Agent, or Firm*—Patent Law Offices of Heath W. Hoglund

(57) ABSTRACT

A concrete-based mortar is prepared for application on the exterior of a concrete building or other structure. The drying time of the concrete-based mortar is reduced by addition of an accelerant compound. After the concrete-based mortar sets on the building or other structure, an exterior skin of the concrete-based mortar is removed. This provides an even and attractive surface while reducing the amount of labor time required to complete the application.

4 Claims, 2 Drawing Sheets

METHOD OF APPLYING CONCRETE-BASED MATERIAL

FIELD OF THE INVENTION

The invention relates to an improved method of applying a one-coat concrete-based material to the interior or exterior of a building or other structure. More specifically, the invention relates to the use of an improved concrete-based mortar that improves labor efficiency in the application process.

BACKGROUND

Concrete-based materials are used in a variety of applications. For example, concrete-based materials are often used to cover walls or other structures. U.S. Pat. No. 6,046,269, issued Apr. 4, 2000, by Nass et al., teaches a concrete-based compound that is used to create a Fresco-Like finish on a wall or other structure. The drying time of certain mixtures taught by this patent can be reduced by the use of propylene glycol and methyl carbitol. In effect, these compounds act as accelerants that speed the drying process. Other accelerates for concrete-based materials are commercially available. For example, BETTOR MBT, S. A., manufactures and sells an accelerate, which is commercially available as BETTACEL. BETTOR MBT may be contacted through their Internet web site, which is hosted at: www.bettor-mbt.es, or at either of the following physical addresses: Headquarters, BETTOR MBT, S. A., Joiers, s/n, 08184 Palau de Plegamans, (Barcelona), Spain; Telephone: 93 862 00 23; Facsimile: 93 862 00 19; or Production, BETTOR MBT, S. A., Duero, 23, Polígono Ind. Mejorada, 28840 Mejorada del Campo, (Madrid), Spain; Telephone: 91 668 21 56; Facsimile: 91 668 17 75.

The accelerant, BETTACEL, is an aqueous solution made with inorganic salts and halogens. Its main function is to accelerate drying time and hardening of mortar, increasing the mortar resistance in the process. The accelerant may be used even at low temperatures. This accelerant comes in a liquid state, and should be mixed first with part of the water to be used with the mortar, and then added to the mortar as the rest of the water is added. It comes in containers weighing 30 kg or 250 kg. The characteristics of this accelerant are as follows:

| Color: | Cloudy, non-color |
| --- | --- |
| pH: | $9 \pm 1$ |
| Density: | $1.3 \pm 0.02$ g/cm$^3$ |
| Chloride ions amount: | $25.5 \pm 1.5\%$ |

The recommended dosage is 2 to 5% of the weight of the mortar being used. This percentage varies according to the desired effect (how fast you want the mortar to dry), the temperature and the type of cement with which the accelerant will be applied.

Again, concrete-based materials are widely used on buildings or other structures to provide an even exterior surface. The concrete-based materials are spread over a rough concrete surface. Such rough concrete surfaces include bricks, blocks or stones that are held together by a cement.

Concrete-based materials for providing an even exterior surface are widely known, and commonly used in the construction arts. For example, U.S. Pat. No. 4,222,785, issued Sep. 16, 1980, by Henderson, teaches a concrete-based material suitable for application to the exterior of a building. This particular mixture provides certain insulating characteristics.

U.S. Pat. No. 4,229,225, issued Oct. 21, 1980, by Kraszewski et al., teaches another concrete-based material suitable for application to the exterior of a building. This particular mixture includes:

20–60% cement;

30–70% inorganic or organic filler;

2–10% zirconium, hafnium, vanadium or cesium silicate fibers;

0.2–1% plasticizers for cement;

1–3% adhesive; and 0.1–0.5% water-repellent.

This above mixture provides certain water-repellent characteristics discussed therein.

U.S. Pat. No. 4,946,505, issued Aug. 7, 1990, by Jungk, teaches yet another concrete-based material. More specifically, it teaches certain methods of dying concrete-based materials. The dyed materials may be applied to the exterior of a building or other structure.

Each of the above-identified patents are expressly incorporated herein by reference.

Similar one-coat concrete-based materials are also widely available in commercial markets. For example, Lafarge Texsa Morteros and Sermarksa sell many generic one-coat grey or white concrete-based products called Monocapa. Lafarge Texsa Morteros can be contacted at the following physical address: Lafarge Texsa Morteros, Pol. Can Peligrí, C/Ferro, 7-08755, Catellbisbal (Barcelona), Spain; Tel. 936351290. Sermarksa can be contacted at the following physical address: Sermarksa, Carr. 152 Km9, 08110 Monocada, Rey Sak, Barcelona, Spain; Tel. 935726500.

PROPAMSA, S. A., is another company that manufactures and sells a number of concrete-based (or mortar-based) products that may be used to create an even interior or exterior surface on a building or other structure. These include PROPAM REVOC and REVAT RASPADO. PROPAMSA may be contacted at the following physical address: PROPAMSA, S. A., Ctra. N-340 Km 1242.3, Pol. Ind. Les Fallulles, San Vincent Del Horts, 08620 Barcelona, Spain. The application and characteristics of these products are discussed below.

The PROPAM REVOC and REVAT RASPADO products can be used by following a simple three-step process. First, the products are mixed with water to the desired consistency. Second, the products are applied to a rough concrete surface using a smooth trowel 100 (shown in FIG. 1). Third, when the product becomes semi-dry, the exterior skin is removed using a rough trowel 200 (shown in FIG. 2). This creates an even exterior finish that is both attractive and resistant to weather. FIG. 3 shows the application of these concrete-based materials 310 to a block wall 320.

PROPAM REVOC is a mortar based on cement, additives and aggregates that give it the property of high impermeability. It must be applied to a base that is resistant, completely hardened and extremely clean (free of dust, paint, oil, etc.). Also, if the base is exposed to sun or is made of a highly absorbent material, then the surface must first be dampened before applying PROPAM REVOC.

PROPAM REVOC is sold in 25 kg bags that are mixed manually or mechanically with 17% water (about 4.5 L). Once it is mixed it must be applied within 25 minutes or it will begin to harden. This mixture comes in gray and white and will cover approximately 2 kg/m$^2$ per cm of thickness. This, however, depends upon both the flatness and the roughness of the surface. For example, rough brick surfaces will require more, relatively smooth and even concrete walls will require less.

The characteristics of this particular product are as follows:

| | |
|---|---|
| Apparent density of the powder: | 1.6 g/cm³ |
| Mixing water: | 17% |
| Apparent density of the paste: | 2.0 g/cm³ |
| Mixtures lifetime: | 90 minutes |
| Density of hardened product: | 1.7 g/cm³ |
| Flexotraction strength: | 20 kg/cm² |
| Compressive resistance: | 60 kg/cm² |
| Coefficient of capillarity: | 0.6 g/dm² min^{1/2} |
| Modulus of elasticity: | 85.000 kg/cm² |

REVAT RASPADO is a one-coat mortar also based on cement, additives and aggregates that give protection as well as a decorative finish to a building. This product is impermeable to rain water and permeable to water vapor to prevent condensation.

REVAT RASPADO is prepared by mixing the 30 kg bag with 20% water (6 L) until a smooth paste is formed. Once the mixture is made, it must stand for 5 minutes so the mixture will settle. Then the mixture is spread with a trowel. If it is applied to a highly absorbent surface, a first coat should be applied as a primer. The additives include dyes, and the product is available in a variety of colors. It will cover approximately 20 kg/m² per cm of thickness. The type of finish and lack of flatness of the surface will alter the coverage of this mortar. The characteristics of this particular product are as follows:

| | |
|---|---|
| Product in powder form: | |
| Apparent density: | 1.4 g/cm³ |
| Loss in 450° C. fire: | 1% |
| Loss in 900° C. fire: | 35% |
| Particles greater than 1.2 mm: | 4.0% |
| Particles greater than 0.18 mm: | 55.0% |
| Product in paste form: | |
| Mixing water: | 20% |
| Apparent density: | 1.8 g/cm³ |
| Hardened product: | |
| Product density: | 1.6 g/cm³ |
| Flexural strength: | 35 kg/cm² |
| Compressive resistance: | 80 kg/cm² |
| Tensile strength: | 8.3 kg/cm² |
| Elasticity modulus: | 90,000 kg/cm² |
| Shrinkage: | 1.0 mm/m |
| Coefficient of capillarity: | 1 g/dm² min^{1/2} |
| Permeability to vapor: | 0.5 g/m² h mmHg |

Under typical application conditions (approximately 80 degrees Fahrenheit and high humidity), the expected dry time of PROPAM REVOC or REVAT RASPADO can exceed 4 hours (as long as 6 hours has been observed). As will be appreciated from the foregoing, the application of these products is labor intensive. First, the application requires a significant expenditure of labor hours even for a relatively small area. Then, after the product has set, another significant expenditure of labor hours is required to remove the exterior skin with the rough trowel. The labor-intensive nature of these products is not unique. Other concrete-based materials used to treat the interior and exterior of a building also require a significant expenditure of labor hours.

SUMMARY

It is an object of the invention to reduce the labor hours required to apply and finish an even mortar-based interior or exterior to a building or other structure.

According to one aspect of the invention, an even interior or exterior surface is formed on a building. The method is especially suited for reducing the labor requirements of applying a concrete-based material to the building. A concrete-based mortar is mixed with water and a quantity of accelerant sufficient to cause the resulting composition to set in approximately two hours. The concrete-based mortar is applied to a concrete surface with a smooth trowel to form a mortar surface. An exterior portion of the mortar surface is removed after approximately two hours by scraping a rough trowel against the mortar surface.

According to further aspects of the invention, the concrete-based mortar has, by weight, at least fifty-percent of particles greater than 0.18 millimeters in diameter and at least two-percent of particles greater than 1.2 millimeters in diameter. The accelerant has inorganic salts and halogens and includes, by weight, chloride ions in an amount of approximately twenty-five percent.

According to another aspect of the invention a concrete-based mortar and an accelerant are mixed with water to form a resulting composition that sets within three hours. The resulting composition is applied to an exterior of a building and allowed to set for at least two hours. The exterior portion of the resulting composition is removed within three hours.

According to further aspects of the invention, the concrete-based mortar is a powder and the accelerant is composed of inorganic salts and halogens.

According to yet another aspect of the invention, a concrete-based mortar includes sand, particles and cement. An accelerant is mixed with the concrete-based mortar in an amount sufficient to cause the concrete-based mortar to set in less than three hours when mixed with water and applied to a concrete structure.

According to a further aspect of the invention, the concrete-based mortar includes particles, such as sand, having a diameter of greater than 0.18 millimeters as at least half the composition of the concrete-based mortar. At least a percent of those particles have a diameter greater than 1.2 millimeters.

DETAILED DESCRIPTION

Figure 4:
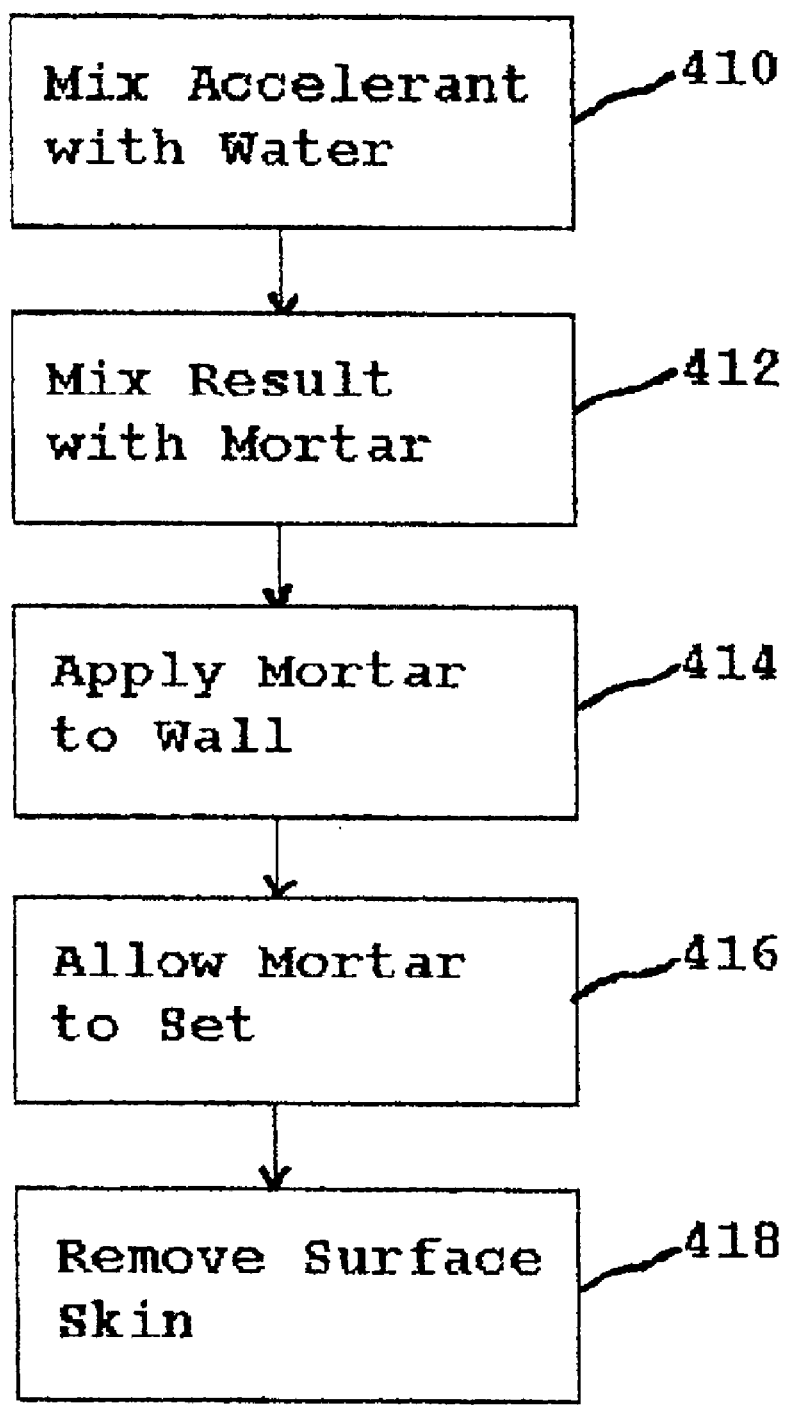
FIG. 4 is a flow chart showing one preferred method of applying a concrete-based mortar to the exterior of a building or other structure.

With reference to FIG. 4, one preferred method of implementing the invention will be described. The process begins at step 410 by mixing an accelerant with water. As used herein, an accelerant is any compound, mixture, substance, liquid, powder or process that reduces the drying time of a concrete-based material. Here the accelerant, BETTACEL, available from BETTOR MBT, S. A., is mixed with water. The properties of this particular product are set forth above.

Next, at step 412, the accelerant and water mixture is added to a concrete-based mortar. As used herein, concrete-based mortar is any compound having sand, aggregates and cement as components of the mortar. Here, one of the concrete-based mortars, PROPAM REVOC or REVAT RASPADO, available from PROPAMSA, S. A., is used. The properties of these particular products are set forth above.

Figure 1:
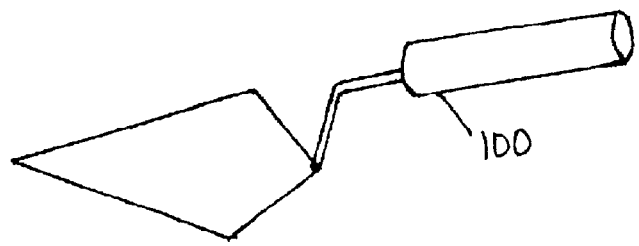
FIG. 1 is a perspective view of a smooth trowel (prior art).

Next, at step 414, the resulting mixture is applied to the exterior or interior of a building or other structure. As those skilled it the art will appreciate, the surface should be clean and free of any oils, dust, dirt, debris, etc., to aid the formation of a strong bond between the mixture and the building or other structure. The mixture is applied with a smooth trowel 100 (shown in FIG. 1) in a layer that is approximately 1 cm thick. When applied to rough surfaces the thickness may vary somewhat. Preferably, however, the mixture is applied to a relatively smooth surface such as a flat block wall.

Figure 2:
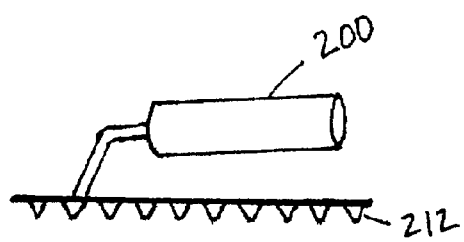
FIG. 2 is a perspective view of a rough trowel (prior art).
Figure 3:
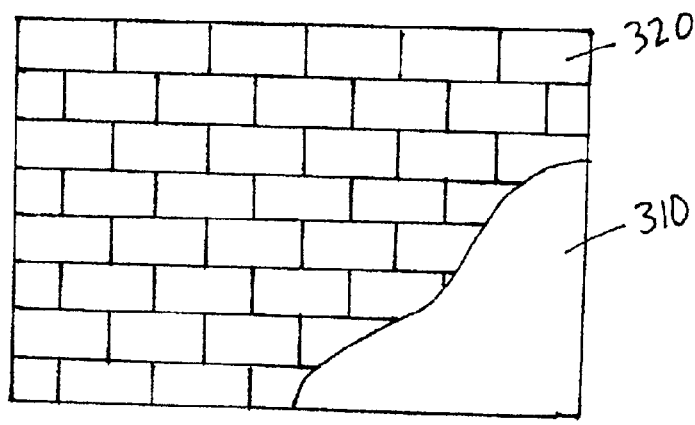
FIG. 3 is an elevation view of a concrete wall partially covered with mortar (prior art).

After application, at step 416, the mixture is allowed to set so that a skin begins to form on the exterior of the mixture. As the mixture is setting, the mason(s) may continue to apply the mixture on other parts of the building. As the mason finishes such other parts, the first application will have set and is ready to be scraped with the rough trowel 200 (shown in FIG. 2). Likewise, as the mason finishes scraping the first application, the subsequent application will have begun to set. Such areas may then be scraped with the rough trowel 200 as well.

At step 416, the applied mixture is tested to determine whether it has sufficiently set so that it is ready to be scraped with the rough trowel 200. The rough trowel 416 is briskly scraped against a small section of the mixture, in an inconspicuous area. If the mixture sticks to the spikes 212 of the rough trowel 416, then it is not dry yet and cannot be scraped. When the rough trowel 200 can pass across the applied mixture in a way that removes the exterior skin but does not stick to the spikes 212, then the applied mixture is dry and the area is completely scraped. This process effectively removes the excess cement mixture and creates a relatively smooth and even surface on the wall of a building since the rough trowel guides you preventing uneven scraping of-the wall.

The following table sets forth the expected dry time for the listed mixtures of the concrete-based mortar, PROPAM REVOC, the accelerant, BETTACEL, and water, in conditions of shade, high-humidity, and approximately 70–80 degrees Fahrenheit:

| PROPAM REVOC (Kilograms) | WATER (grams) | Accelerant (grams) | Dry Time (hours:minutes) |
| --- | --- | --- | --- |
| 2.5 | 400 | 0 | 3:50 |
| 2.5 | 400 | 50 | 3:30 |
| 2.5 | 400 | 62.5 | 2:45 |
| 2.5 | 400 | 75 | 2:15 |
| 2.5 | 400 | 87.5 | 1:30 |
| 2.5 | 400 | 100 | 0:55 |

This other table sets forth the expected dry time for the listed mixtures of the concrete-based mortar, PROPAM REVOC, the accelerant, BETTACEL, and water, in conditions of sunlight, high-humidity, and approximately 70–80 degrees Fahrenheit:

| PROPAM REVOC (Kilograms) | WATER (liters) | Accelerant ($cm^3$) | Dry Time (hours:minutes) |
| --- | --- | --- | --- |
| 25 | 5 | 0 | 3:00 |
| 25 | 5 | 100 | 2:30 |
| 25 | 5 | 200 | 2:10 |
| 25 | 5 | 300 | 1:45 |
| 25 | 5 | 400 | 1:50 |
| 25 | 5 | 500 | 1:32 |

Generally, a reduction in dry time helps to improve the efficiency of the labor-intensive application process. In particular, the shortened dry time helps to minimize the down time of a mason between the application and scraping steps. Without the shortened dry time, a mason might have to wait as the applied material sets. As the mixture is applied, it dries relatively quickly and the mason can then scrape the applied material. The resulting surface provides an attractive, even finish.

The preferred mixture consists of 2.5 kg of the above cement-based mortar, 400 grams of water, and 75 grams of the above accelerant. This mixture sets in approximately 2 hours to 2 hours and 15 minutes. Although further reductions in the dry time are possible, they can begin to cause other application problems. For example, a further reduction in dry time can cause the applied material to set completely before the mason has an opportunity to scrape the surface. This can make the scraping process much more difficult, if not impossible, in obtaining an attractive, even surface. It can also begin to crack because the faster it dries the higher the temperature of the concrete mixture. This high temperature causes it to crack, thus rendering it useless.

Similar results can be obtained with other concrete-based mortars. For example, the concrete-based mortar REVAT RASPADO, the above accelerant, and water can also be mixed to obtain a similar dry time. Specifically, a mixture of 3 kg of this concrete-based mortar, 75 grams of the accelerant, and 600 grams of water provide the preferred characteristics.

Again, the reduced drying time of these concrete-based mortars make the application and scraping of the concrete-based mortar much faster. This reduces labor time and associated costs. Also, the resulting material is very easy to scrape. The mixture also makes it possible for the job of applying and scraping to be finished the same day it was started. This reduces any wasted materials as may occur with a longer dry time.

Although the invention has been described with reference to preferred embodiments, those skilled in the art will appreciate that many modifications are possible without departing from the scope of the invention. More specifically, although the invention has been described with reference to specific concrete-based mortars, accelerants and application steps, other compounds and steps may also be used. For example, the concrete-based mortar may be mixed with a solid accelerant in powder form in a composition that achieves the above-described benefits. Many other modifications are also possible. The following claims are intended to cover all such modifications and variations of the invention.

I claim:

1. A method of applying a concrete-based mortar to a building comprising the steps of:

mixing a concrete-based mortar, an accelerant and water to form a resulting composition that hardens in approximately three hours time or less;

applying the resulting composition to an exterior of a building;

allowing the resulting composition to harden on the building for a time sufficient to prevent reformation of the composition; and removing an exterior skin of the resulting composition after the step of allowing the resulting composition to set, wherein the step of removing the exterior skin of the resulting composition comprises scraping a rough trowel against the resulting composition to remove only the exterior skin, wherein the resulting composition has hardened sufficient to prevent uneven scraping and has hardened sufficient to prevent sticking to the rough trowel, and wherein the resulting composition has a smooth and even surface after the step of removing the exterior skin.

2. The method of claim 1, wherein the step of mixing a concrete-based mortar comprises mixing the concrete-based mortar having particles approximately 1 millimeter or greater in diameter.

3. The method of claim 2, wherein the step of removing an exterior skin comprises scraping a rough trowel against the resulting composition to remove at least a portion of the particles approximately 1 millimeter or greater in diameter from the exterior skin but without removing subcutaneous mortar or particles.

4. A method of applying a concrete-based mortar to a building comprising the steps of:

mixing a concrete-based mortar, an accelerant and water to form a resulting composition that hardens in approximately three hours time or less;

applying the resulting composition to an exterior of a building;

scraping the resulting composition with a rough trowel to remove only an exterior skin from the resulting composition and to leave a smooth and even surface; and allowing the resulting composition to harden, after the step of applying the resulting composition and before the step of scraping the resulting composition, for a time sufficient: (a) to prevent reformation of the resulting composition; (b) to prevent uneven scraping of the resulting composition by the rough trowel; and (c) to prevent any of the resulting composition from sticking to the rough trowel.

* * * * *